Feb. 16, 1926.
E. A. WHYBREW
1,572,979
COUPLING
Original Filed Feb. 28, 1921
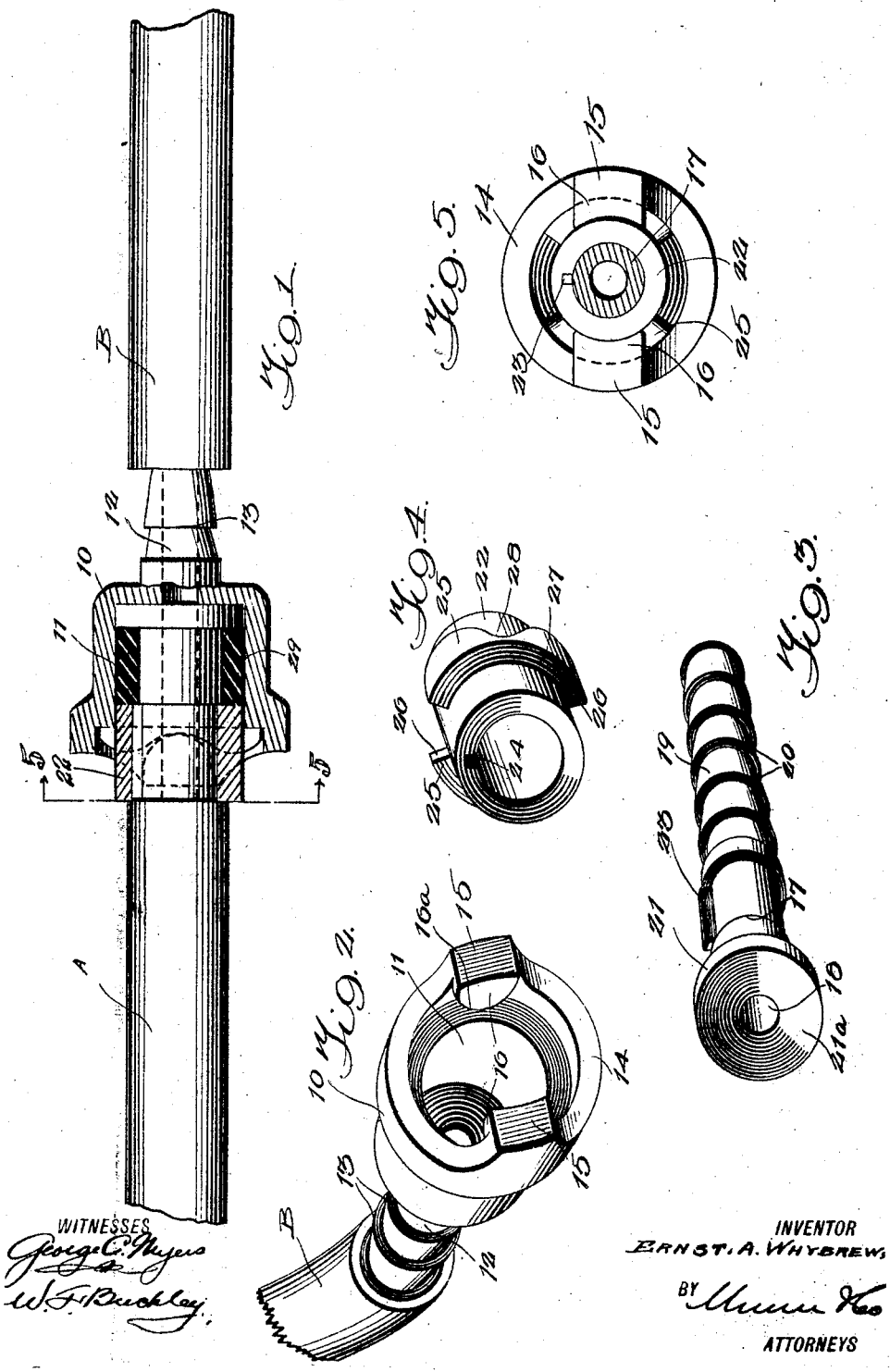
INVENTOR
ERNST. A. WHYBREW,
ATTORNEYS Patented Feb. 16, 1926.

1,572,979

UNITED STATES PATENT OFFICE.

ERNST ADISON WHYBREW, OF COLLINGWOOD, ONTARIO, CANADA.

COUPLING.

Application filed February 23, 1921, Serial No. 448,438. Renewed July 9, 1925.

*To all whom it may concern:*

Be it known that I, ERNST ADISON WHYBREW, a citizen of the United States, and a resident of Collingwood, in the Province of Ontario and Dominion of Canada, have invented certain new and useful Improvements in Couplings, of which the following is a specification.

The present invention relates in general to couplings and more particularly to a coupling especially adapted to be associated with air hose or similar pipe lines utilized for the transmission of fluids under pressure.

The object of the invention is to provide a coupling of this character which is of simple and durable construction, reliable in operation and easy and inexpensive to manufacture, which is not impaired by forces tending to pull the members of the coupling apart but which resolves these forces in such manner that they act to enhance the seal of the coupling and to further the coupling action and which may be easy assembled and disassembled by partial turning movement in either direction though securely held against accidental displacement.

Other objects and advantages of the invention reside in certain novel features of construction, combination and arrangement of parts which will be hereinafter more fully described and particularly pointed out in the appended claims, reference being had to the accompanying drawings forming part of this specification, and in which:

Figure 1 is a view, partly in section and partly in elevation, illustrating the coupling embodied in the pipe line;

Figure 2 is a detail perspective view of the socket member of the coupling;

Figure 3 is a detail perspective view of the head member;

Figure 4 is a detail perspective view of the sleeve of the head member;

Figure 5 is a transverse sectional view on line 5—5 of Figure 1.

Referring to the drawings wherein for the sake of illustration is shown the prefered embodiment of the invention, the meeting ends of the pipe line to be coupled are designated at A and B, respectively, and preferably comprise the usual sections of flexible hose such as for instance is utilized between the cars of a train line.

The coupling utilized to connect the flexible hose A and B of the pipe line comprises a socket member designated generally at 10 and having an internal cylindrical cavity 11 communicating with a short pipe 12 integrally formed therewith and having on its periphery a plurality of circumferentially extending gripping edges 13 whereby when the short pipe 12 is inserted in the adjacent flexible hose B the gripping edges 13 will bite into the material of the flexible hose and securely retain the socket member in connection with the flexible hose B. At its outer end the socket member 10 is provided with an enlarged annular flange 14 having extensions 15 upon which are formed at diametrically opposite points inwardly radial lock lugs 16 having curved locking faces 16ª.

A head member, designated generally at 17, is provided and is adapted to cooperate with the socket member to complete the coupling. The head member is provided with an axial bore 18 which communicates with a pipe 19 preferably integrally formed with the head member and having a plurality of gripping edges 20 formed on its periphery and engageable with the section 18 when the pipe 19 is inserted therein to insert the head member with the section A. The head member has at one end a piston 21 adapted to be operatively received in the cylindrical cavity 11 of the socket, as shown in Figure 1, and having a working face 21ª adapted to be operated upon by the fluid pressure to enhance the coupling action. A sleeve 22 is splined on the head member 17 and is free to partake of a limited degree of longitudinal movement with respect thereto but is constrained against rotary movement relative to the head member by means of a key 23 secured on the head member and received in the key-way 24 provided in the sleeve 22. An interrupted locking flange 25 is formed on the periphery of the sleeve and extends substantially circumferentially thereof. The notches defined by the interrupted sleeve are designated at 26 and are located at substantially diametrically opposite points and are of an extent sufficient to permit passage therethrough of the lock lugs 16 of the socket member. The face of the locking flange adapted to be disposed innermost in the socket member is plane, as designated at 27, but the opposite face thereof is curved as shown in the drawings to provide for the easy entrance and removal of the lock lugs into the recesses 28 provided in this curved face of the locking flange. These recesses are curved as well as the faces themselves of the locking flange and their curvature corresponds to the curvature of the lock lugs. A bushing 29 of rubber or other suitable elastic packing material is arranged on the head between the piston 21 and the sleeve 22 and is adapted in its normal position to completely fill the space between the piston and the sleeve and to extend outwardly to points coincident with the periphery of the piston. The socket member and the cylinder are designed so that the distance between the piston 21 of the head member and the highest points on the curved face of the locking flange is greater than the distance between the inner end of the socket cavity and the lock lugs so that in locking and unlocking the coupling the rubber bushing must be compressed to a slight degree. This prevents accidental displacement but does not interfere with easy assembling and disassembling.

In practice, when the hose sections A and B are to be coupled the head member is inserted in the socket member so that the piston of the head member enters the cylindrical cavity of the socket member, the lock lugs passing through the notches so that the locking flange lies behind the lock lugs. The head and socket members are then turned relative to each other so that the lock lugs ride upon the curved face of the locking flange and finally seat in the recesses 28. When pressure is established in the pipe line it will be exerted against the working face of the piston and will compress the bushing 29 expanding it radially and enhancing the seal of the coupling. Not only the pressure is effective in this respect but also any pull that may be exerted upon the couplings. When disassembling it is only necessary to grasp the head and socket members and to turn them relative to each other. The curved surfaces of the lock lugs then ride up upon the curved faces of the locking flange until these lock lugs are alined with the notches and the elasticity of the bushing displaces the lock lugs through the notches and disassociates the members of the coupling.

I claim:

1. In a coupling, a socket coupling member having a cavity and having lock lugs rigid therewith, a head member having a piston operatively received in the cavity of said socket member and having a working face exposed to the fluid pressure, a sleeve splined on said member, an interrupted locking flange rigid with said sleeve and engageable with said lock lugs and an elastic packing bushing arranged on said head member between said piston and said sleeve and adapted to be expanded into sealing contact with said socket member by said piston.

2. In a coupling of the character described, a socket coupling member having a cylindrical cavity, and an enlarged annular flange provided with extensions having inwardly extending lock lugs, a head member having a piston operatively received in said cavity, a sleeve splined on said piston and having an outwardly extending interrupted locking flange cooperable with said lock lugs, and an elastic bushing arranged on said head between said piston and said sleeve and adapted to be expanded into sealing contact with said socket member by said piston.

ERNST ADISON WHYBREW.